(No Model.) 2 Sheets—Sheet 1.
C. F. SHOEMAKER.
CAR BRAKE.
No. 544,936. Patented Aug. 20, 1895.
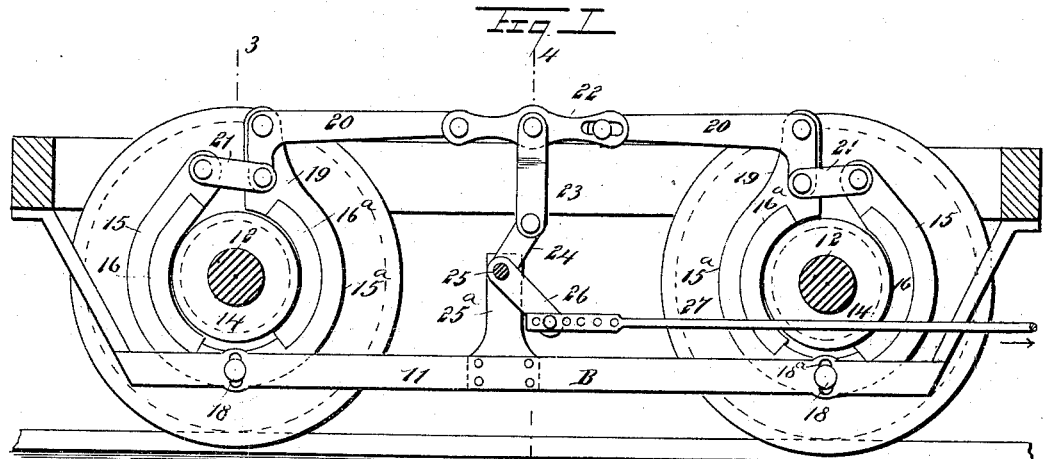
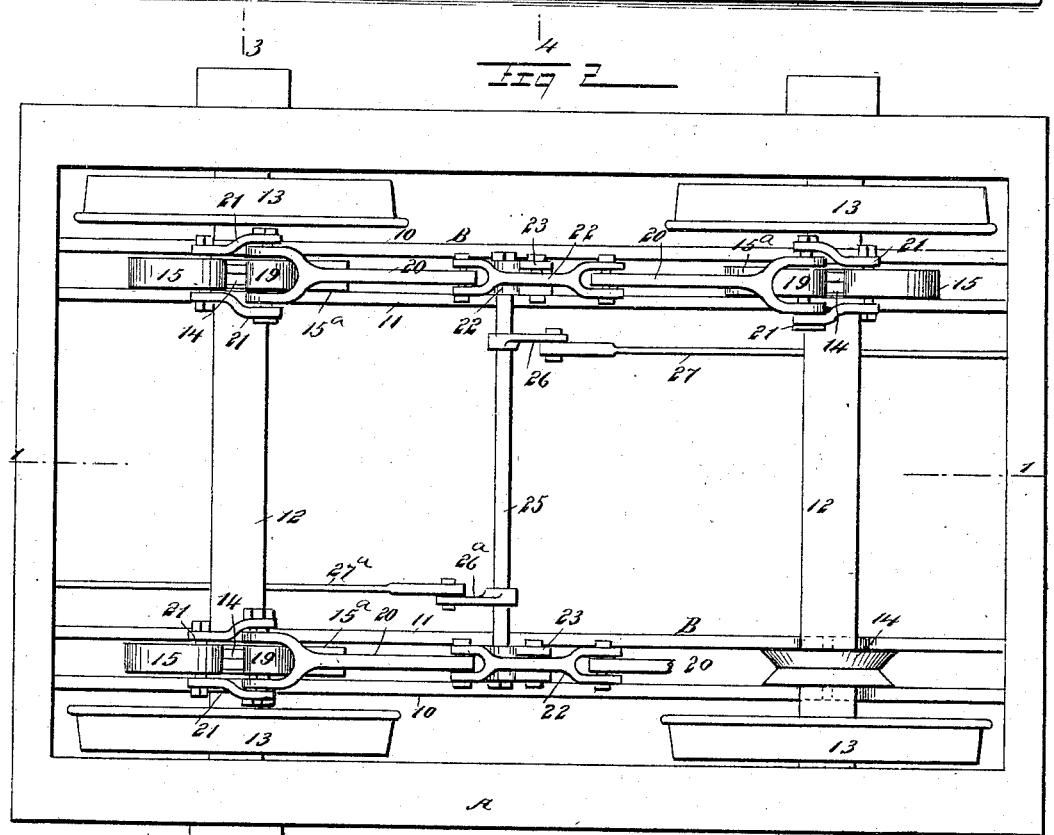
WITNESSES:
H. Walker
J. Fred. Acker
INVENTOR
C. F. Shoemaker
BY
Munn & Co.
ATTORNEYS.

(No Model.) 2 Sheets—Sheet 2.
C. F. SHOEMAKER.
CAR BRAKE.

No. 544,936. Patented Aug. 20, 1895.

WITNESSES:
H. Walker
J. Fred Acker

INVENTOR
C. F. Shoemaker
BY Munn & Co
ATTORNEYS.

UNITED STATES PATENT OFFICE.

CHARLES F. SHOEMAKER, OF CHICAGO, ILLINOIS.

CAR-BRAKE.

SPECIFICATION forming part of Letters Patent No. 544,936, dated August 20, 1895.

Application filed April 20, 1895. Serial No. 546,511. (No model.)

*To all whom it may concern:*

Be it known that I, CHARLES F. SHOEMAKER, of Chicago, in the county of Cook and State of Illinois, have invented a new and useful Improvement in Brakes, of which the following is a full, clear, and exact description.

My invention relates to an improvement in brakes, and especially to an improvement in car-brakes; and it has for its object to provide a brake which will be positive and thorough in its action, and which may be quickly applied and released, and, furthermore, wherein the brake will be of exceedingly simple construction and capable of application to the axle of any vehicle.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 3:
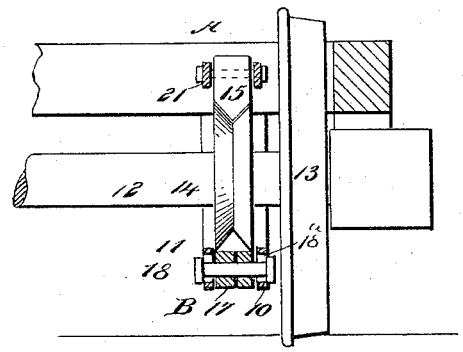
Figure 4:
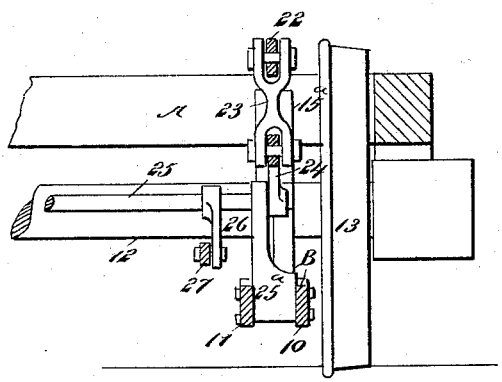
Figure 5:
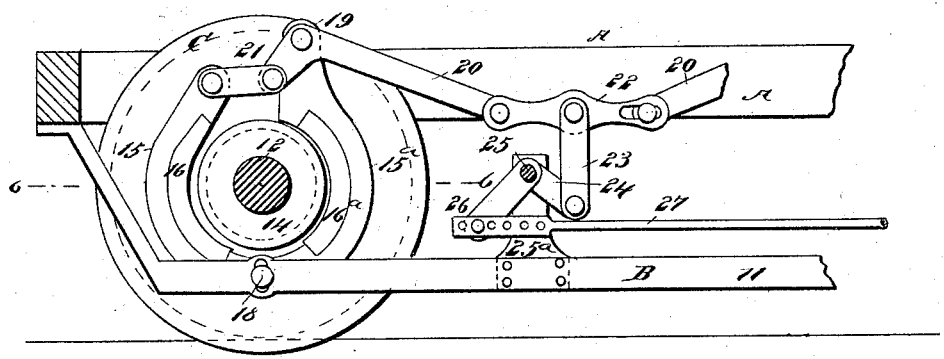

Figure 1 is a longitudinal section through a car-truck, illustrating the application of the brake mechanism thereto. Fig. 2 is a plan view of the brake mechanism and truck. Fig. 3 is a transverse section taken substantially on the line 3 3 of Fig. 1. Fig. 4 is a similar section taken practically on the line 4 4 of Fig. 1. Fig. 5 is a sectional view through one of the axles, illustrating the brake released therefrom, it being shown in gripping position in Fig. 1; and Fig. 6 is a sectional view through the brakes proper and a plan view of the surface with which braking-contact is made, the section being on the line 6 6 of Fig. 5.

The brake is illustrated as applied to a car-truck A, and the latter may be of any approved type. The truck is shown provided at each side with a longitudinal pedestal B, each pedestal comprising two parallel and spaced bars 10 and 11, supported from the ends of the truck; but the construction of the pedestal may be changed, if desired. The axles 12 are mounted in the usual way and are provided with the customary wheels 13, fast thereon, and each axle is further provided near each wheel with a brake-wheel 14, having a V-groove in its periphery.

Figure 6:
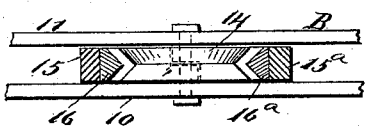

A brake is adapted for braking-contact with each of the grooved wheels 14, and each brake is made in two sections 15 and $15^a$, the sections being of segmental form and the sections are provided with brake-shoes 16 $16^a$ upon their inner faces, substantially V-shaped in cross-section and adapted to enter the V-groove of the brake-wheel in connection with which the brake is employed, as shown in Fig. 6, the said shoes being made to follow the peripheral contour of the wheel. The two sections 15 and $15^a$ of the brake are provided with ears 17 at their lower ends adapted to interlock, and the interlocking-ears are pivoted immediately beneath the center of the axle by passing the ears between the bars 10 and 11 of a pedestal and providing a suitable pivot-pin 18, as shown in Fig. 3. The pivot-pins 18 are passed through elongated openings $18^a$ in the pedestals, permitting the clamps to fall when the brakes are not set and allowing the clamps to clear the brake-wheels entirely. The slots $18^a$ also tend to release the clamp when the applied power is released, and again, if the openings $18^a$ are made just large enough to admit the pivot-pins the brake-shoes are prevented from touching the brake-wheel on the bottom when the applied brake-power is enforced. The section $15^a$ of each brake is provided with an extension 19 at its upper end, substantially vertical, and is therefore longer than the opposing section 15, and it may here be remarked that the longer sections of the brakes on the two axles are made to face one another, as illustrated in Fig. 1.

An elbow-lever 20, having its vertical member forked, is pivoted at its forked portion to the upper end of the extension 19 of each brake-section $15^a$, and the lower extremities of the vertical members of each of these levers are connected by a link 21 with the section 15 of the brake to which the lever is applied. The horizontal members of the elbow-levers 20 are much longer than the vertical members, and the said horizontal members of the levers attached to longitudinally-aligning brakes are pivotally connected by a cross-head 22, the connection between one of the levers 20 of a set and the cross-head being a sliding one. The cross-head has pivotally attached to its center a downwardly-extending link 23, forming a toggle, and the links 23 at both sides of the car-trucks are pivotally connected with crank-arms 24, secured upon the outer ends of a transverse shaft 25, placed between the two axles and journaled in bearings 25ª, carried preferably by the pedestals.

The transverse shaft 25 is provided with a forwardly-extending crank-arm 26, intermediate of its ends, and a rearwardly-extending crank-arm 26ª, the said crank-arm 26 being attached to a brake-rod 27, and the crank-arm 26ª is secured to a similar rod 27ª. These rods lead to opposite ends of the car, where they may be connected with any form of brake-applying mechanisms.

In the operation of this brake, when tension on the brake-rods 27ª is removed the crank-arms 24 at the ends of the crank-shaft will gravitate downward, assisted by the toggle connections between said arms and the elbow-levers 20, since these toggles will drop downward also at that time, and in so doing will slightly elevate the vertical members of the elbow or bell-crank levers 20, as shown in Fig. 5, in which position of the levers the sections of the brakes are forced apart out of braking engagement with the brake-wheels 14. When, however, tension in an outwardly direction is applied to either of the brake-rods 27 or 27ª, the shaft 25 will be rocked in a direction to force the end crank-arms 24 upward, and under this movement the toggle comprising the links 22 and 23 will be straightened out and carried upward until the two links are at right angles to one another. Under this straightening of the toggles the shorter member of the elbow or bell-crank levers will be drawn inward and brought to vertical position, as shown in Fig. 1, and the brake-sections will be drawn together and their shoes made to contact firmly and positively with the brake-wheels. It will thus be observed that at an application of the brakes from either end of the car both brakes of both axles will be simultaneously brought into operation and that they will be likewise simultaneously released.

Having thus described my invention, I claim as new and desire to secure by Letters Patent—

1. In a brake, the combination, with the axles of a truck and a peripherally grooved wheel secured on each axle, of a brake for each wheel and each comprising two segmental sections, pivotally connected to a fixed support below the center of the axle, the said brake sections having brake shoes shaped to conform to and enter in the groove of the wheel attached to the axle, one of the brake sections being provided with an extension at its upper end, an elbow lever fulcrumed on the said extension, a link connecting the vertical member of the lever with the upper portion of the opposing brake section, and means, substantially as described, for simultaneously operating both brakes, as and for the purpose set forth.

2. The combination, with an axle and a brake wheel secured thereon and provided with a peripheral V-groove, of a brake constructed in two segmental sections, pivotally attached to a support located below the center of the axle, each brake section being provided with a brake shoe V-shaped in cross section to enter and fill the groove in the brake wheel, an angled lever fulcrumed upon the upper end of one of the brake sections, its vertical member being shorter than its horizontal member, a link connection between the vertical member of the lever and the upper end of the opposing brake section, a crank shaft, and a toggle connection between the crank shaft and the horizontal member of the said lever, as and for the purpose specified.

3. In a car brake, the combination, with the axles of a car truck, brake wheels secured upon the axles, having peripheral V-grooves, and pedestals supported beneath the brake wheels, of a brake constructed in two segmental sections, a brake being adapted for application to each brake wheel and the sections being pivoted upon the pedestal beneath the center of the wheel, each section having a brake shoe shaped correspondingly to the shape of the grooves of the brake wheels, the inner sections of longitudinally aligning brakes being provided with extensions at their upper ends, angle levers fulcrumed upon said extensions, having their shorter and vertical members pivotally connected with opposing sections of the brake to which the levers are applied, a crank shaft, means for manipulating the crank shaft, and toggle connections between the crank shaft and horizontally aligning angle levers, as and for the purpose specified.

4. In a brake mechanism, a brake wheel having a V-shaped peripheral groove and adapted for attachment to an axle, a brake constructed in segmental pivotally connected sections, the pivot thereof having a vertical movement in a fixed support but adapted to prevent horizontal movement at the pivotal point adapted to embrace the brake wheel and to be pivoted below the center thereof, the braking surfaces of the sections being shaped correspondingly to the grooves of the brake wheels, an angle lever pivoted to one section of the brake and having link connection with the opposing section, the action of the lever being to draw the sections together or force them apart, and a brake-controlling mechanism connected with the said lever, as and for the purpose specified.

5. In a brake mechanism for cars, the combination, with the axles, brake wheels secured upon the said axles and provided with a peripheral V-groove, and brakes adapted to grip the brake wheels, each brake being constructed in segmental sections pivotally connected with each other at their lower ends, and to a support located beneath the brake wheel to which the brake belongs, the brake shoes of the brake sections corresponding in cross section to the cross sectional shape of the brake wheel groove, one section of each brake being provided with an extension at its upper end, of an angled lever fulcrumed upon the upper end of the longer section of each brake and connected by a link with the corresponding portion of the shorter section of the brake, a rock shaft located between the axles and provided with a crank arm, a horizontal link pivotally connecting longitudinally opposing levers, and a vertical link connecting the central portion of the horizontal link with the said crank arm, and means, substantially as shown and described, for rocking the shaft, as and for the purpose set forth.

CHARLES F. SHOEMAKER.

Witnesses:
J. G. SHOEMAKER,
C. E. REXSTREW.